US008948286B2

(12) United States Patent
Banerjee et al.

(10) Patent No.: US 8,948,286 B2
(45) Date of Patent: Feb. 3, 2015

(54) WIRELESS COMMUNICATION SYSTEM MAPPING DATA BITS TO SYMBOL BIT POSITIONS ACCORDING TO ERROR RATES OF THOSE BIT POSITIONS AND DATA CONTENT

(75) Inventors: Suman Banerjee, Madison, WI (US); Sayandeep Sen, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 613 days.

(21) Appl. No.: 12/908,726

(22) Filed: Oct. 20, 2010

(65) Prior Publication Data

US 2011/0176590 A1 Jul. 21, 2011

Related U.S. Application Data

(60) Provisional application No. 61/253,252, filed on Oct. 20, 2009.

(51) Int. Cl.
*H04L 5/12* (2006.01)
*H04L 1/00* (2006.01)
*H04N 19/89* (2014.01)
*H04L 1/20* (2006.01)
*H04W 4/18* (2009.01)
*H04W 28/04* (2009.01)

(52) U.S. Cl.
CPC .............. *H04L 1/007* (2013.01); *H04L 1/0071* (2013.01); *H04N 19/00933* (2013.01); *H04L 1/203* (2013.01); *H04W 4/18* (2013.01); *H04W 28/04* (2013.01)
USPC ........................................................ 375/261

(58) Field of Classification Search
CPC ....... H04L 1/007; H04L 1/0071; H04L 1/203; H04W 4/18; H04W 28/04
USPC ............. 375/240.01, 240.24, 240.25, 240.27, 375/240.28, 261, 295, 298, 364
See application file for complete search history.

(56) References Cited

U.S. PATENT DOCUMENTS

| | | | |
|---|---|---|---|
| 2003/0031233 A1* | 2/2003 | Kim et al. ...................... | 375/146 |
| 2003/0076870 A1* | 4/2003 | Moon et al. .................... | 375/130 |
| 2004/0013105 A1* | 1/2004 | Ahmavaara et al. .......... | 370/349 |
| 2007/0204205 A1* | 8/2007 | Niu et al. ....................... | 714/780 |
| 2007/0260965 A1* | 11/2007 | Schmidt et al. ............... | 714/799 |
| 2008/0037883 A1* | 2/2008 | Tsutsumi et al. ............. | 382/232 |
| 2008/0104489 A1* | 5/2008 | Ito ................................. | 714/794 |
| 2008/0310461 A1* | 12/2008 | Bader et al. ................... | 370/537 |
| 2008/0313526 A1* | 12/2008 | Choi et al. ..................... | 714/780 |
| 2009/0141811 A1* | 6/2009 | Mohan ..................... | 375/240.25 |

OTHER PUBLICATIONS

L.L. et al., The udp-lite protocol, http://www.ietf.org/rfx/rfc3828.txt, pp. 1-8, Jul. 2004.
Feamster, N. et al., Packet Loss Recovery for Streaming Video, Workshop on Packet Video, Pittsburg, Apr. 2002, pp. 1-11, MIT, Cambridge, MA, USA.

(Continued)

*Primary Examiner* — Syed Haider
(74) *Attorney, Agent, or Firm* — Boyle Fredrickson, S.C.

(57) ABSTRACT

A transmitter-receiver pair encode data as transmitted symbols according to knowledge about variations in noise immunity between different bit positions of the symbols as a decoded. High usefulness data may be preferentially encoded at those bit positions having greatest noise immunity to improve transmission effectiveness.

11 Claims, 3 Drawing Sheets

(56) References Cited

OTHER PUBLICATIONS

Jamieson, K., PPR: Partial Packet Recovery for Wireless Networks, SIGCOMM '07 Proceedings of the 2007 conference on Applications, technologies, architectures, and protocols for computer communications, ACM New York, NY, USA.

Katti, S., et al., Symbol-Level Network Coding for Wireless Mesh Networks, SIGCOMM '08 Proceedings of the ACM SIGCOMM 2008 Conference on Data Communication, ACM New York, NY, USA.

Lin, K. C.-J., et al., Ziptix: Exploiting the Gap Between Bit Errors and Packet Loss, ACM Mobicom, pp. 351-362, 2008, ACM, New York, NY, USA.

Miu, A., et al, Multi-Radio Diversity in Wireless Networks, Wireless Networks, 13(6), pp. 1-26, Dec. 2007, Kluwer Academic Publishers Hingham, MA, USA.

Seferoglu, H., et al., Rate Distortion Optimized Joint ARQ-FEC Scheme for Real-Time Wireless Multimedia, .IEEE International Conference on Communications, May 16-20, 2005, pp. 1190-1194 vol. 2, IEEE, Piscataway, NJ, USA.

Tian, D., et al., Optimal Packet Scheduling for Wireless Video Streaming with Error-Prone Feedback, Proceedings, IEEE WCNC, 2004, IEEE, Piscataway, NJ, USA.

Wang, Y., et al., Error Control and Concealment for Video Communication: a Review. Proceedings of the IEEE, May 1998, vol. 86 Issue: 5, pp. 1-71, IEEE, Piscataway, NJ, USA.

Woo, G.R., et al., Beyond the Bits: Cooperative Packet Recovery Using Physical Layer Information, MOBICOM, 2007, ACM, New York, NY, USA.

* cited by examiner

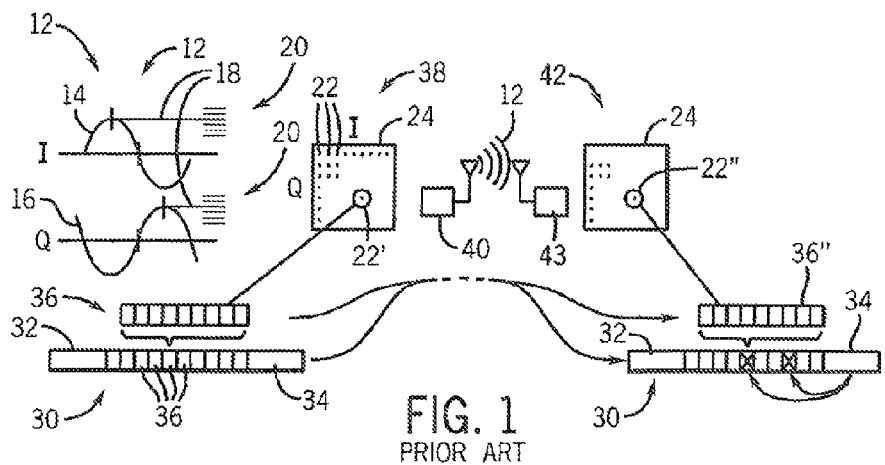
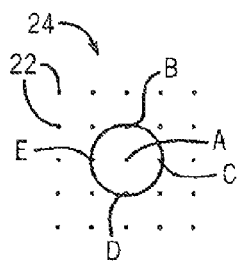
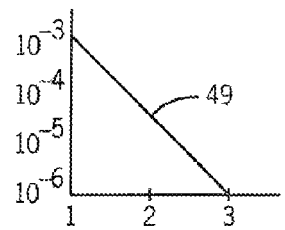
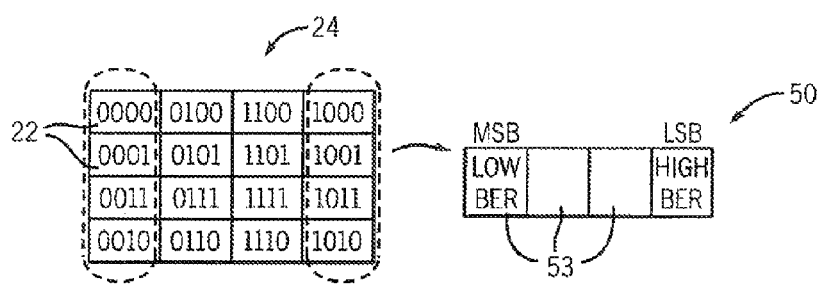
FIG. 1 PRIOR ART
FIG. 2
FIG. 3
FIG. 4

WIRELESS COMMUNICATION SYSTEM MAPPING DATA BITS TO SYMBOL BIT POSITIONS ACCORDING TO ERROR RATES OF THOSE BIT POSITIONS AND DATA CONTENT

CROSS REFERENCE TO RELATED CASE

This case claims the benefit of U.S. provisional application 61/253,252 filed Oct. 20, 2009 and hereby incorporated by reference.

STATEMENT REGARDING FEDERALLY SPONSORED RESEARCH OR DEVELOPMENT

This invention was made with government support under 0520152 awarded by the National Science Foundation. The government has certain rights in the invention.

BACKGROUND OF THE INVENTION

The present invention relates to wireless transmitters and receivers for transmitting and receiving digital data and, in particular, to transceiver systems that encode and decode data in a manner that takes advantage of different error rates of different bit positions in transmitted symbols.

Sophisticated wireless transceivers, used in mobile devices such as cell phones and computers, transmit digital data encoded into a physical signal such as a radio wave. This encoding processes multiple bits as a data unit into "symbols" which describe discrete states of the physical parameters of the transmitted signal. For example, in Quadrature Amplitude Modulation, (QAM) discrete amplitudes of two orthogonal sinusoidal waves are used in combination to create many different symbols of a "symbol constellation". QAM can provide for different constellation sizes, e.g., 16 symbols in 16-QAM (distinguishing four amplitude levels), 64 symbols in 64-QAM (distinguishing eight amplitude levels), and 256 symbols in 256-QAM (distinguishing 16 amplitude levels).

At the receiver, the symbols are decoded into the multi-bit data units by matching the physical parameters of the received signals to the discrete states of symbols in the constellation. In QAM, the amplitudes of the orthogonal sine waves are measured and the symbol having the closest amplitude is assumed to have been transmitted.

When data is being transmitted in a noisy environment, it may be impossible to distinguish among the necessary amplitude levels of many symbols and a large constellation, for example, among the 256 symbols of 256-QAM. In these cases, it is known to adjust the transmitter and receiver to operate with a smaller constellation, for example 64-QAM, to provide greater distance between the symbols and thus more robust decoding in the face of noise. Alternatively or in addition, it is known to reduce the effective data rate of the transmission in order provide redundant data transmission, for example, using diversity to provide for redundant transmission channels or longer error detection and correction codes providing for effectively greater data redundancy.

If the received radio signal cannot be correctly decoded into a symbol, the symbol is discarded by the decoding process. Typically, incorrect reception is signaled by error detection codes transmitted with the data, which indicate a corruption of that data.

SUMMARY OF THE INVENTION

The present inventors have recognized that some data in an incorrectly received symbol may nevertheless be salvageable. Based on a predictable variation in bit error rates within different bit positions in single symbols, the invention harvests a portion of the bits of erroneous symbols rather than discarding all of these bits. In one embodiment, high usefulness data is preferentially placed in bit positions that have fewer errors thereby increasing the likelihood that high usefulness data can be recovered even in the face of symbol errors.

Generally, the invention differs from systems that salvage non-erroneous bits from an erroneous data unit, for example, using error correcting code identifications, by the fact that the data units are intermixed before transmission to put high usefulness data in lower likely error positions within the data units, so that high usefulness data can be conveyed, often without retransmission, despite data unit errors.

Specifically then, one embodiment of the present invention provides a wireless transmitter having a physical transmitter transmitting symbols each mapping to multiple bits under an encoding system. A prioritizer divides received multi-bit data units into at least two categories of relative high and low usefulness and an interleaver creates mixed multi-bit data units incorporating high usefulness bits from high usefulness data units and low usefulness bits from low usefulness data units. An encoder then maps the mixed multi-bit data units to symbols and provides the symbols to the physical transmitter for transmission according to the encoding system. The interleaver and encoder cooperate to map high usefulness bits to bit positions of symbols having relatively lower data error rates and to map low usefulness bits to bit positions of symbols having relatively higher bit error rates under the encoding system.

It is thus a feature of at least one embodiment of the invention to exploit predictable expectations in error rates in different bit positions of symbols under a particular encoding to promote the transmission of data arbitrarily designated to be of higher usefulness.

The interleaver may create the mixed multi-bit data units by interleaving bits from different data units according to a determination of bit error rates for mapping of multi-bit data units to symbols of the constellation under the encoding system so that higher usefulness valued bits are mapped to bits having the lower bit error rates and lower valued usefulness bits are mapped to bits having higher bit error rates.

It is thus a feature of at least one embodiment of the invention to permit the encodings process to be largely unchanged by using the interleaving process to properly allocate bit positions according to value of application data.

The transmitter may transmit periodic pilot symbols to the receiver whose value is known by the receiver independent of the transmission to determine bit error rates based on an evaluation of the pilot symbol by the receiver.

It is thus a feature of at least one embodiment of the invention to permit dynamic determination of those bits which are most robust against interference.

The transmitter may select the encoding system from a set of different encoding systems based on an expected value of the bit error rates for the different encoding systems depending on instantaneous channel conditions.

It is thus a feature of at least one embodiment of the invention to not only permit flexible selection of different encoding systems based on transmission conditions but to select these encoding systems to promote the ability to salvage partial data from erroneous symbols.

The wireless transmitter may use a quadrature amplitude modulation wherein the different symbols also known as constellation points represent different combinations of amplitude values of two sinusoidal waves that are 90° out of phase with each other. It may also use pulse position modulation (PPM), Pulse amplitude modulation (PAM) and Phase Shift Keying (PSK) as well as others.

It is thus a feature of at least one embodiment of the invention to provide an improvement adaptable to common modulation systems.

The received multi-bit data units may be an encoded video stream having frames of a plurality of multi-bit data units whose decoding depends on other frames and a usefulness may be given to a given multi-bit data unit so that multi-bit data units having relatively greater numbers of dependent frames have relatively higher usefulness.

It is thus a feature of at least one embodiment of the invention to provide an improved method of transmitting video data.

The encoding systems are selected from the group consisting of Grey, Block encoding as well as others.

It is thus a feature of at least one embodiment of the invention to provide a system for improved data transmission applicable to a wide variety of encoding systems.

Similarly, one embodiment of the invention may provide for a wireless receiver having a physical receiver receiving from a transmitter wireless symbols and a decoder, mapping parameters of each received symbol to a multi-bit data unit according to an encoding system. An error detector may detect an error in an erroneous multi-bit data unit received from the decoder but determined to be likely different from a corresponding multi-bit data unit transmitted by the transmitter. An extractor receives the erroneous multi-bit data unit characterized as having an error to extract bits from the given multi-bit data unit, the extracted bits having relatively lower data error rates for the particular encoding system than those bits not extracted and a collector collecting extracted bits from multiple multi-bit data units to provide new multi-bit data units to be output from the receiver.

It is thus a feature of at least one embodiment of the invention to salvage portions of the data of transmitted symbols that would otherwise be wholly discarded.

The error detector may detect the error through an error correction code associated with the given multi-bit data unit.

It is thus a feature of at least one embodiment of the invention to provide a method of identifying erroneously decoded symbols.

Various features of the invention are set forth in the above description, following claims and the attached documents. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

BRIEF DESCRIPTION OF THE FIGURES

FIG. 1 is a simplified representation of a QAM transceiver system representing one type of transceiver system adaptable to the present invention;

FIG. 2 is a schematic representation of a portion of the symbol constellation of the receiver of FIG. 1 showing likely erroneously decoded symbols around a given transmitted symbol;

FIG. 3 is a simplified graph showing experimentally derived error rates for different Euclidean distances between a given transmitted symbol and the location of erroneously decoded symbols for that given transmitted symbol;

FIG. 4 is a representation of the encoding of multi-bit data units to symbols of a constellation for a simple 16-QAM encoding using a Gray encoding, and a bit error map for the multi-bit data units implicit in this encoding;

DETAILED DESCRIPTION OF THE PREFERRED EMBODIMENT

Figure 5:
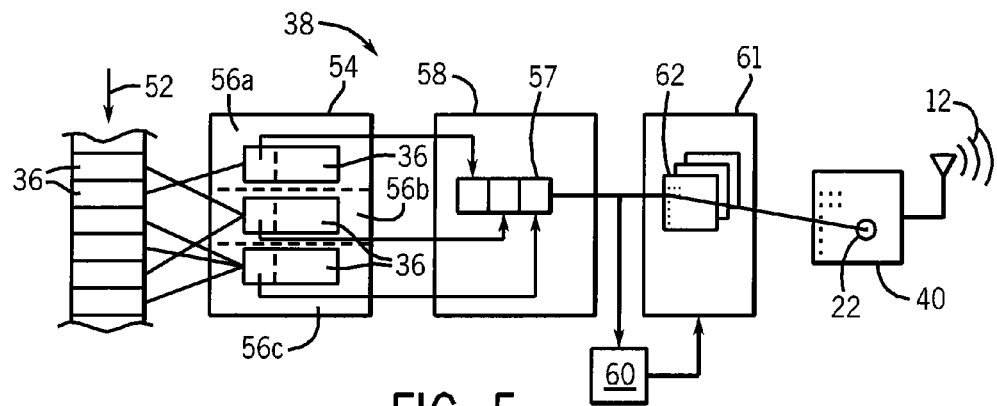
FIG. 5 is a block diagram of a transmitter of the present invention such as encodes multi-bit data units according to known or measured to error rates.

Referring now to FIG. 1, a prior art QAM transmitter- and receiver system 10 may provide for radio signal 12 being a combination of two quadrature phased sine waves, that is, an in-phase (I) sine wave 14 and a quadrature (Q) sine wave 16 of equal frequency but 90° phase offset from the sine wave 14. The amplitudes 18 of the sine waves 14 and 16 may be independently set to values within a range of different discrete levels 20, for example eight levels for 64-QAM. These discrete amplitude levels define symbols 22 in a two-dimensional constellation 24 corresponding to all 64 combinations of different amplitude levels.

The transmitter system 38 may receive a data frame 30 having header information 32, error correction codes 34, and a variety of data units 36 each providing eight bits of multi-bit data unit. Generally, it will be understood, that the present invention is not limited to multi-bit data units having eight data bits but may be used by a multi-bit data unit of any size.

A given data unit 36 may be mapped to a particular symbol 22' and the signal parameters associated with that symbol 22' provided to a physical transmitter 40 for transmission of the radio signal 12 according to those parameters (e.g. amplitudes of waves 14 and 16).

A physical receiver 43 being part of a receiver system 42 may receive the radio signal 12 and identify from the physical parameters of the radio signal 12 a particular symbol 22" ideally being identical to the symbol 22'. This symbol 22" is mapped to a data unit 36' ideally identical to data unit 36. The data unit 36" may be combined with other received data units 36 transmitted by a similar process into a reconstructed data frame 30 and the error correction code 34 applied to detect any erroneous data units 36". These data units 36 are then discarded and scheduled for retransmission.

Referring now to FIG. 2, a given transmitted symbol A may be corrupted during the transmission process to be interpreted as a different symbol. Typically the different symbol will be a near the symbol A, for example, being the symbols B, C, D, or E immediately adjacent to symbol A in the constellation 24. In the example shown, the constellation is rectilinear and symbols E and C are to the left and right of symbol A and symbols B and D are above and below symbol A, respectively, to each be separate from symbol A by a Euclidean distance of one. The present invention, however, is not limited to rectilinear consolations and nearest symbols should be understood generally.

The present inventors have established that typical errors in decoding symbols result primarily in the identification of an erroneous symbol within a Euclidean distance of one from the intended symbol. Referring momentarily to FIG. 3, an empirical evaluation of the error rate function 49 conducted by the present inventors and based on a transmission of 10 million known 64-QAM found that the chance of an error of one was approximately 1/100-1/1000 while the chance of an error of distance three was 1/100,000-1/1,000,000. Accordingly, one may expect relatively small error distances in the constellation. Details of this study are found in S. Sen, S. Gilani, S. Srinath, S. Schmitt, S. Banerjee: Design and implementation of an "approximate" communication system for wireless media applications, Proceedings of the ACM SIGCOMM 2010 conference on SIGCOMM: pages 15-26, hereby incorporated by reference.

Referring now to FIG. 4, a Gray encoded constellation 24 provides for differences in values for only one bit position between adjacent symbols 22. A representative Gray encoded 16-QAM constellation 24 provides for four columns and four rows where the left-hand column has values of mapped data units 36 with identical most significant bits (i.e., 0) to the mapped data units 36 of the adjacent second column from the left. Likewise the rightmost column of the constellation 24 has values of mapped multi-bit data units 36 with most significant bits (i.e., 1) that are identical to the adjacent mapped multi-bit data units 36 of the second column from the right.

Accordingly, assuming the likelihood of errors of only one symbol position as described above, it will be seen that the most significant bit for mapped multi-bit data units 36 in the left and right column are statistically highly resistant to error.

This observation can be used to generate a bit error rate (BER) map 50 providing bit error values 53 for each bit position of the encoded multi-bit data unit 36. The BER map 50 may be deduced by applying the function 49 of FIG. 3 to each symbol of a mapped multi-bit data unit 36 to determine likelihood of error for each bit position of that symbol and summing these likelihoods of error over the entire constellation for each bit position. In the BER map 50 of the Gray encoding system of FIG. 4, the most significant bit position will have a relatively low bit error rate (BE) based on the observations related to the left and right columns of the constellation 24 but the least significant bit will have a higher bit error rate.

This variation in the likelihood of errors in different bit positions of mapped data units is true not only for Gray encoding but for a variety of different encoding techniques and may be deduced by the above technique under the assumption of equally distributed errors among different bit positions.

This difference between bit error rates for different bit positions of multi-bit data units 36 as mapped to a constellation 24 has been recognized but not utilized for the purposes of the present invention which uses that mapping to place higher usefulness data in more reliable bit positions.

Referring now to FIG. 5, a transmitter system 38 modified according to the present invention, may receive a stream 52 of data, for example, not limited to frame data for MPEG encoded video. The data units 36 of the stream 52 may each comprise a multi-bit data unit, for example a byte of data. The data units 36 may be received by a prioritizer 54 which sorts the data according to usefulness into one of three bins: a high usefulness bin 56a, a medium usefulness bin 56b, and a low usefulness bin 56c. Generally these priorities may be determined by a higher-level program and communicated to the prioritizer 54, but they may also be deduced by the prioritizer 54, for example in the case of video data, by implementing initial stages of the decoding process. The usefulness of the data units 36 generally reflects an underlying value of the data by the receiver(s) and thus affects a value-throughput of data from the transmitter to the receiver (that is data quantity weighted by data value). Example priorities may be based on, for example, the number of intended recipients of the data, imminence of an expiration of a deadline for data transmission, or sensitivity of a human observer to loss of the data. In the present embodiment, the usefulness reflects a category of the video data according to whether the data is from an I-frame, a P-frame or a B-frame in a group of pictures (GOP) in MPEG encoding. As is generally understood in the art, an I-frame may be decoded in isolation whereas a P-frame and B-frame are dependent on data from other frames for complete decoding. Each of these different frames may be associated with a numeric value proportional to the number of other frames they require for successful decoding. I-frames need only their own data for successful decoding and hence may have the highest usefulness. B-frames have the greatest dependencies and thus have the least usefulness.

Individual data units 36 in each of the bins 56a-c are then interleaved into multiple interleaved data unit 57 by interleaver 58 so that the highest usefulness data is placed in bits having the highest resistance to error as encoded into symbols. For example, in the case of two I-frame nibbles 0100 and 0010, a P-frame nibble of 1101 and a B-frame nibble of 1001, the interleaver 58 reassembles this data into interleaved data unit 57. A first nibble of 0111 takes the first two bits of the first I-frame nibble as the most significant bits and the first two bits of the P-frame nibble as the least significant bits. A second nibble of 0001 takes the last two bits of the first I-frame nibble as the most significant bits and the last two bits of the P-frame nibble as the least significant bits. A third nibble of 1101 takes the first two bits of the second I-frame nibble as the most significant bits and the first two bits of the B-frame nibble as the least significant bits, and a fourth nibble of 1001 takes the second two bits of the second I-frame nibble as the most significant bits and the second two bits of the B-frame nibble as the least significant bits.

It will be understood that the high usefulness I-frame data will thus be encoded in the most noise immune bit positions for the Gray encoding scheme described above. Referring still to FIG. 5, the interleaved data unit 57 may be subject to error correction code generation per error correcting code generator 60 and the data from both mapped by an encoder 61 according to an encoding scheme 62 (in this case Gray encoding) to a particular symbol 22 of the physical transmitter 44 transmission.

Figure 6:
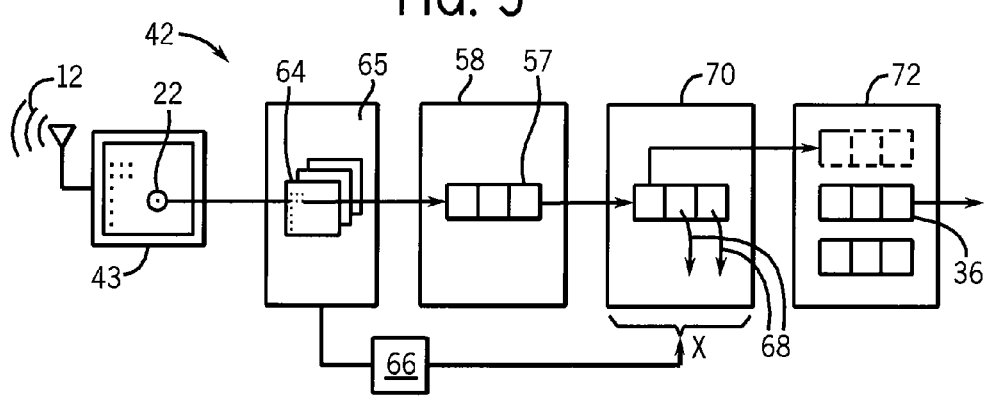
FIG. 6 is a figure similar to that of FIG. 5 showing a receiver for use with the transmitter of FIG. 5.

Referring now to FIG. 6, transmitted radio signal 12 may be received by physical receiver 43 which may decode each symbol 22 using decoder 65 executing a selected decoding scheme 64 being the complement of encoding scheme 62. The result of the decoding is a decoded interleaved data unit 57'. A similar process is used to provide data units holding error correcting codes to an error correcting code decoder 66 which may be used to determine whether the interleaved data unit 57' is valid.

If the interleaved data unit 57' is not valid, then at an extractor 70, the lower order bits (LSB) of the interleaved data unit 57' are discarded as indicated by arrows 68 while the highest order bits (MSB), in this case the two most significant bits, are assembled at a collector 72 together with previously extracted or later extracted bits into a reconstituted data unit 36, in this case an I-frame byte.

A similar reconstruction process for all orders of bits is performed in cases where the error correction code indicates that the decoded interleaved data unit 57 is not an error. For example, each such reconstruction may assemble simultaneously an I-frame byte from the highest order two bits and either a P-frame and B-frame byte from the lowest order two bits.

Figure 7:
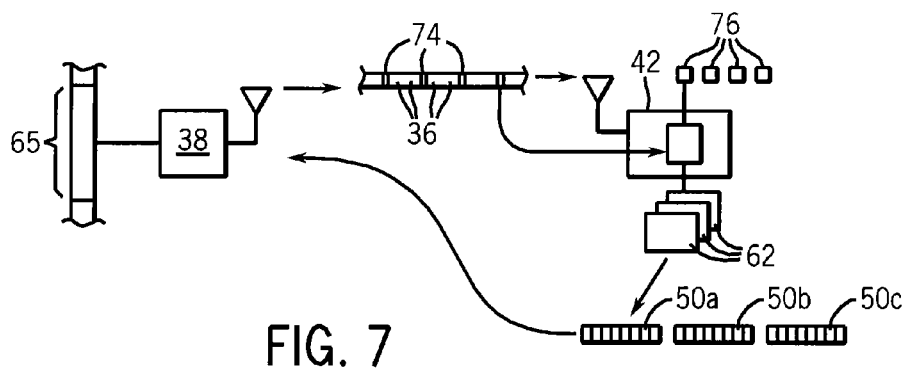
FIG. 7 is a data flow diagram showing use of pilot data transmitted between the transmitter and receiver for dynamically measuring bit error rates for different encoding systems.

Referring now to FIG. 7, as noted above with respect to FIGS. 5 and 6, the encoder 61 in decoder 65 may permit for a selection on long multiple different encoding schemes 62 and decoding schemes 64. These schemes 62 and 64 may, for example, include Gray encoding as discussed at above, including different forms of Gray encoding, but may alternatively include a wide variety of other encoding systems known in the art. For example, Block I encoding can be used in which symbols 22 in each quadrant of the constellation 24 have the same value for the first two bit positions and each of these quadrants is partitioned into four sub quadrants such that each sub quadrant has the same bit values for the next two bit positions and so forth. Alternatively Block II encoding can be used which provides a different decoding process where the receiver first tries to find a best fit quadrant using the first two bits in the sequence and then eliminate symbols in all other quadrants and tries to find the best sub quadrant and so forth.

Referring now to FIG. 7, the best encoding system may be determined dynamically by evaluating bit error rates for the data units 36 actually transmitted under different encoding systems. In this process the transmitter system 38 may send pilot data units 74 interspersed among the data units 36 of each data frames 30, for example one pilot data unit 74 for every 100 data units 36. The pilot data units 74 are known to receiver system 42 by means other than their transmission of that pilot data unit 74, for example, through a known sequence 76 of pilot data units 74 providing an indication of an expected value of the pilot data unit 74 predictable from the preceding N pilot data units 74. In this way, the receiver system 42, knowing the actual value of the pilot data unit 74, may accurately detect errors in the received symbol for that pilot data unit 74. By analyzing the received and intended symbols 22 as decoded by variety of different encoding scheme 62, the receiver system 42 may develop BER maps 50a-50c for each possible encoding and decoding schemes 62 and 64. These BER maps 50 may be transmitted back to the transmitter system 38 which may look at a block of data 65 to be transmitted to determine the best encoding system for that block 65 by a simple computation of the anticipated effectiveness of each encoding system for the block of data using the BER maps 50a-50c, for example, as described above with respect to function 49.

Figure 8:
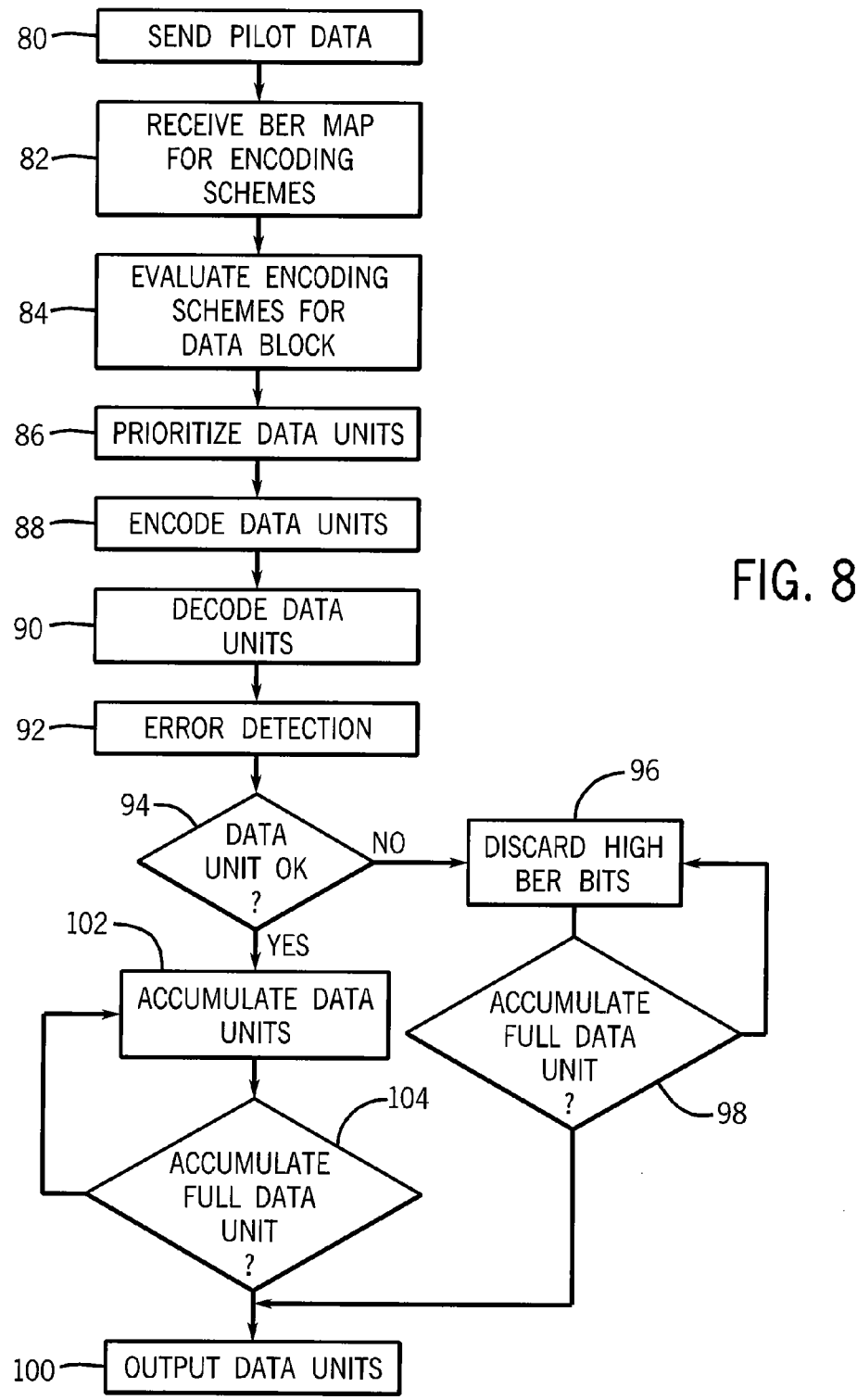
FIG. 8 is a flow chart of the steps of the present invention implemented flexibly in the transmitter and receiver of FIGS. 5 and 6.

Referring now to FIG. 8, the present invention may implement these steps through discrete circuitry, application specific integrated circuits (ASICs), field programmable gate arrays (FPGAs), microprocessors and the like, and may divide the tasks generally among the transmitter system 38 and receiver system 42 as convenient or practical.

At a first process block 80, the transmitter system 38 may transmit the pilot data units 74 as described above and at process block 82 the receiver may calculate the bit error rates for a variety of different encoding methods. At process block 84, the transmitter system 38 may evaluate the encoding methods based on the bit error rate determined by the receiver for a particular block of data being transmitted.

The transmitter system 38, as indicated by process block 86, may then prioritize the data units 36 to be transmitted and produce interleaved data units 36 according to the desired encoding system that exploits the known bit error rates. At process block 88, the transmitter system 38 may encode the interleaved data units 36 using the encoding system selected at process block 84 and may transmit error correction codes and other data necessary to inform the receiver of the decoding process.

At process block 90, the receiver system 42 may receive the encoded data and decode it using a corresponding decoding scheme communicated through header information on a data frame 30 or the like from the transmitter system 38. At process block 92, the receiver system 42 may detect whether there are errors in the received interleaved data units 36. If at decision block 94 there is an error, then at process block 96 high error bits may be discarded (not necessarily the least significant bits, depending on the encoding system) and the low error bits may be accumulated into data units.

At decision block 98, if a data unit is fully accumulated, it may be output as indicated by process block 100.

At decision block 94 if there are no errors in the received data units, each of the slices of the interleaved data unit may be de-interleaved and accumulated at process block 102 and at decision block 104; once the accumulation is complete, the data unit may be output as indicated by process block 100.

As will be understood to those of ordinary skill in the art generally a given transmitter and receiver (forming a transceiver) will be provided at each node in the communication link so that the mechanisms described above will be duplicated for each user. Data unit as used herein is not intended to be limited to a particular number of bits. The invention contemplates use with a wide variety of modulation systems providing single and multi-dimensional constellations and different encoding systems.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What we claim is:

1. A wireless transmitter for transmitting data elements having multi-bit data units distinct from error detection data, the wireless transmitter comprising:
    a physical transmitter transmitting symbols characterized by one or more parameters of a transmitted wireless signal that together define a constellation of symbols each mapping to the multi-bit data units under an encoding system, bits of the multi-bit data units having bit positions;
    a prioritizer dividing received multi-bit data units of received data elements into at least two categories of high and low usefulness, the prioritizer changing the division with different multi-bit data units based on a pre-determinable and changing usefulness of the multi-bit data units to a consumer of the data elements;
    and interleaver receiving the multi-bit data units as divided into high and low usefulness and creating mixed multi-bit data units incorporating both high usefulness bits from high usefulness data units and low usefulness bits from low usefulness data units;
    an encoder mapping the mixed multi-bit data units to symbols and providing the symbols to the physical transmitter for transmission according to the encoding system;
    wherein the interleaver and encoder cooperate to map high usefulness bits to bit positions of symbols having lower date error rates and to map low usefulness bits to bit positions of symbols having higher bit error rates under the encoding system, wherein given symbols having lower data error rates are those having fewer contiguous symbols in the symbol constellation and given symbols having higher data error rates are those having more contiguous symbols in the symbol constellation.

2. The wireless transmitter of claim 1, wherein the interleaver creates the mixed multi-bit data units according to a determination of bit error rates for mapping of multi-bit data units to symbols of the constellation under the encoding system so that high usefulness bits are mapped to bits having lower bit error rates and low usefulness bits are mapped to bits having higher bit error rates.

3. The wireless transmitter of claim 2, wherein the transmitter transmits periodic pilot symbols to a receiver whose value is known by the receiver independent of the transmission to determine bit error rates based on an evaluation of the pilot symbol by the receiver.

4. The wireless transmitter of claim 3, wherein the transmitter selects among the encoding system from a set of different encoding systems based on an evaluation of the bit error rates under the different encoding systems for a given channel conditions.

5. The wireless transmitter of claim 1, wherein the transmitter is a quadrature amplitude modulation transmitter and the constellation represents different amplitude values of two sinusoidal waves that are 90° out of phase with each other.

6. The wireless transmitter of claim 1, wherein the encoding system is selected from the group consisting of Grey, Block 1, and Block II encoding.

7. A wireless receiver comprising:
    a physical receiver for receiving data elements having multi-bit data units and distinct error detection data, the wireless receiver receiving from a transmitter wireless symbols characterized by one or more parameters of a transmitted wireless signal that together define a constellation of symbols each mapping to the multi-bit data units under an encoding system, bits of the multi-bit data units having bit positions;
    a decoder mapping parameters of each received symbol to a multi-bit data unit according to the encoding system;
    an error detector detecting an error in an erroneous multi-bit data unit received from the decoder but determined to be different from a corresponding multi-bit data unit transmitted by the transmitter;
    an extractor receiving the erroneous multi-bit data unit characterized as having an error to extract non-erroneous bits from the multi-bit data unit, the extracted bits having lower data error rates for a particular encoding system than those bits unextracted and discarded;
    a collector collecting extracted bits from multiple multi-bit data units of different multi-bit data units to provide new error-free multi-bit data units to be output from the receiver, the collecting being performed based on a decoding scheme received from the transmitter;
    wherein the received symbols represent multi-bit data units of an encoded video stream having frames of a plurality of multi-bit data units whose decoding depends on multi-bit data units from other frames and wherein the extracted bits are portions of multi-bit data units having a fewer number of dependencies than the unextracted bits.

8. A transmitter and receiver system comprising:
    a transmitter receiving data elements having multi-bit data units and distinct error detection data and mapping the multi-bit data units to individual symbols within a symbol constellation, the symbols representing discrete values within a range of physical parameters of a transmitted signal, the transmitter receiving multi-bit data units having different priorities and mixing bits from different multi-bit data units with different priorities to form multi-bit data units to be mapped to symbols, the priorities of the multi-bit data units changing with different multi-bit data units based on a pre-determinable usefulness of the multi-bit data units to consumers of the data elements;

at least one receiver detecting the symbols and mapping them to received multi-bit data units and detecting errors in the received multi-bit data units and extracting a non erroneous portion of the bits of the multi-bit data units that are in error, the extracted portion being related to higher usefulness multi-bit data units received by the receiver to generate new multi-bit data units;

wherein the multi-bit data units include given multi-bit data units whose decoding depends on other multi-bit data units and a usefulness is assigned to a given multi-bit data unit so that the multi-bit data units having greater numbers of dependencies on the other multi-bit data units have lower usefulness.

9. The transmitter and receiver system of claim 8, wherein the transmitter and receiver cooperate to map bits from multi-bit data units having higher priorities to bit positions of the symbols less susceptible to transmission error.

10. The transmitter and receiver system of claim 8, wherein the transmitter and receiver cooperate to test for bit error rates in different bits of multi-bit data units of the symbols for different encodings to select a preferred encoding and mapping within that encoding.

11. The transmitter and receiver system of claim 8, wherein the transmitter and receiver cooperate to test for bit error rates in different bit positions of the symbols for different encodings to select a preferred encoding and mapping within that encoding.

* * * * *